United States Patent
Jouy et al.

(10) Patent No.: US 11,698,003 B2
(45) Date of Patent: Jul. 11, 2023

(54) COOLING DEVICE FOR A TURBINE OF A TURBOMACHINE

(71) Applicant: SAFRAN AIRCRAFT ENGINES, Paris (FR)

(72) Inventors: Baptiste Marie Aubin Pierre Jouy, Moissy-Cramayel (FR); Nicolas Contini, Moissy-Cramayel (FR); Arnaud Doublier, Moissy-Cramayel (FR); Vincent Dubois Dorogi, Moissy-Cramayel (FR); Sébastien Jean Laurent Prestel, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 647 days.

(21) Appl. No.: 16/347,538

(22) PCT Filed: Oct. 27, 2017

(86) PCT No.: PCT/FR2017/052964
§ 371 (c)(1),
(2) Date: May 3, 2019

(87) PCT Pub. No.: WO2018/083403
PCT Pub. Date: May 11, 2018

(65) Prior Publication Data
US 2021/0293179 A1    Sep. 23, 2021

(30) Foreign Application Priority Data
Nov. 4, 2016   (FR) ..................... 1660708

(51) Int. Cl.
*F01D 25/14*   (2006.01)
*F01D 11/24*   (2006.01)

(52) U.S. Cl.
CPC .............. *F01D 25/14* (2013.01); *F01D 11/24* (2013.01); *F05D 2220/36* (2013.01); *F05D 2260/201* (2013.01)

(58) Field of Classification Search
CPC ...................................................... F01D 11/24
See application file for complete search history.

(56) References Cited

U.S. PATENT DOCUMENTS 4,069,662 A * 1/1978 Redinger, Jr ........... F01D 11/24
                                                          60/226.1
4,525,998 A * 7/1985 Schwarz ............... F01D 25/145
                                                          60/226.1
(Continued)

FOREIGN PATENT DOCUMENTS

EP    0892153 A1   1/1999
EP    1798382 A2   6/2007
(Continued)

OTHER PUBLICATIONS

International Patent Application No. PCT/FR2017/052964, International Search Report and Written Opinion dated Feb. 12, 2018, 10 pgs. (relevance in citations and English translation of ISR).

*Primary Examiner* — Courtney D Heinle
*Assistant Examiner* — John S Hunter, Jr.
(74) *Attorney, Agent, or Firm* — Cozen O'Connor

(57) ABSTRACT

A cooling device (11) for a turbine of a turbomachine extending along an axis includes at least one radially inner metal sheet (14) and one radially outer metal sheet (15) that are joined to one another and delimit, between them, cooling air circulation channels (17) extending circumferentially from a connection region (16). Each channel (17) includes at least one air inlet and air ejection orifices (19), that are designed to be oriented toward a region to be cooled. The cooling device also includes at least one cooling duct (21) intended for the circulation of cooling air, the duct (21)

(Continued)

located radially outside said metal sheets (14, 15) and close to or in contact with the metal sheets so as to cool said metal sheets using the cooling air circulating in the duct (21), the cooling duct (21) extending axially and arranged toward the circumferential end regions of the channels (17).

13 Claims, 4 Drawing Sheets

(56) References Cited

U.S. PATENT DOCUMENTS

| | | | | |
|---|---|---|---|---|
| 4,841,726 A | * | 6/1989 | Burkhardt | F01D 11/24 60/226.1 |
| 5,205,115 A | * | 4/1993 | Plemmons | F01D 11/24 60/806 |
| 5,399,066 A | | 3/1995 | Ritchie et al. | |
| 5,980,201 A | * | 11/1999 | Benoist | F01D 25/14 415/115 |
| 6,149,074 A | * | 11/2000 | Friedel | F01D 11/24 239/127.1 |
| 8,092,146 B2 | * | 1/2012 | Legare | F01D 25/12 415/1 |
| 8,181,443 B2 | * | 5/2012 | Rago | F02C 7/185 60/226.1 |
| 2002/0053837 A1 | | 5/2002 | Arilla et al. | |
| 2006/0042266 A1 | | 3/2006 | Albers et al. | |
| 2007/0140838 A1 | | 6/2007 | Estridge et al. | |
| 2010/0139288 A1 | | 6/2010 | Rago | |
| 2015/0361827 A1 | | 12/2015 | Pisacreta et al. | |

FOREIGN PATENT DOCUMENTS

| | | |
|---|---|---|
| EP | 2236772 A2 | 10/2010 |
| FR | 2 867 806 | 9/2005 |

\* cited by examiner

COOLING DEVICE FOR A TURBINE OF A TURBOMACHINE

CROSS-REFERENCE TO RELATED APPLICATIONS

This application is a 35 U.S.C. § 371 filing of International Application No. PCT/FR2017/052964 filed Oct. 27, 2017, which claims the benefit of priority to French Patent Application No. 1660708 filed Nov. 4, 2016, each of which is incorporated herein by reference in its entirety.

TECHNICAL FIELD

The present invention relates to a cooling device for a turbine of a turbomachine, such as an aircraft turbojet, in particular a turbofan engine.

BACKGROUND

A turbofan engine conventionally comprises a fan downstream of which the following elements extend:
 a primary section in which a primary flow circulates, said primary section passing through, in the direction of the primary flow circulation, a low-pressure compressor, a high-pressure compressor, a combustion chamber, a high-pressure turbine and a low-pressure turbine, the primary section being externally delimited at the turbine by a turbine case,
 a secondary section in which a secondary flow, distinct from the primary flow, circulates.

The low-pressure turbine specifically includes several successive stages comprising impellers and stationary parts. The impeller has a disc on which blades are mounted. The ends of the blades are surrounded by a stationary ring made of an abradable material, said ring being attached to the turbine case. In order to guarantee a high efficiency of the turbomachine, the air flow not passing through the impellers of the different stages must be limited, i.e., leaks between the radially outer ends of the blades and the ring made of abradable material must be limited. For this purpose, the clearance at this interface has to be controlled, since such clearance mainly depends on the temperature of stationary parts which support the ring toward the radially outer ends of the blades.

The primary air flow from the combustion chamber is very hot and heats the downstream parts, such as the stationary and mobile parts of the turbine.

In order to control the above-mentioned clearance and to avoid any premature degradation of the various stationary and mobile parts of the turbine, it is necessary to provide effective cooling means that can be easily integrated into the environment of the turbomachine.

The patent application FR 2 867 806, in the name of the Applicant, discloses a device for cooling a turbine case for a turbomachine comprising means for sampling and supply air and means for distributing the sampled air including ramps extending circumferentially about the axis of the turbomachine. The ramps are connected to the air sampling and supply means through connection regions also called collectors. Each ramp has orifices distributed along the ramp, with the extracted air being intended to escape from these orifices to cool the case.

The orifices are uniformly distributed along each ramp so that the flow rate is relatively uniform around the circumference of the case.

It has been noted that the air flowing through the ramps is heated by its environment as it moves along the ramp, i.e., as it moves away from the collector through which the air enters the ramp. The temperature differences of the air passing through the ramp region near the collector and the air passing through the ramp region far from the connection region can be greater than 200° C. for example. The case regions located at a distance from the collectors are therefore less well cooled and are subject to significant thermal stresses. This results in a loss of efficiency due to the increase in clearance in the less cooled case regions.

To avoid this, it is possible to increase the number of collectors distributed around the circumference of the case. This reduces temperature discrepancies within the ramps. However, such a solution affects the weight of the turbomachine.

The patent application FR 2 416 345 discloses a cooling device comprising metal sheets that are joined to one another, mounted radially outside a ring made of an abradable material. The metal sheets delimit, between them, cooling air circulation channels comprising air ejection orifices, oriented towards the ring of abradable material, in order to cool it. This cooling device structure allows the number of collectors to be increased without excessive weight increase.

However, it has been noted that the metal sheets isolate the region between the metal sheets and the abradable material and restrict air circulation in this region, thus limiting heat dissipation so that the regions are relatively hot, which is detrimental to the service life thereof and more generally prevents effective cooling of the region concerned. This results in a decrease in the case cooling in the regions where heat dissipation is limited, and an impact on the efficiency of the turbomachine.

SUMMARY

The invention more particularly aims at providing a simple, efficient and cost-effective solution to this problem.

For this purpose, it offers a cooling device for a turbine of a turbomachine extending along an axis, comprising at least one radially inner metal sheet and one radially outer metal sheet that are joined to one another and delimit, between them, cooling air circulation channels extending circumferentially from a connection region, each channel comprising at least one air inlet and air ejection orifices, that are designed to be oriented toward a region that is to be cooled, characterized in that it comprises means for cooling said metal sheets comprising at least one cooling duct intended for the circulation of cooling air, said duct being located radially outside said metal sheets and close to or in contact with said metal sheets so as to cool said metal sheets using the cooling air circulating in the duct, the cooling duct extending axially and being arranged toward the circumferential end regions of the channels.

For example, the duct consists of at least one pipe or a duct attached to the metal sheets.

The diameter of the air ejection holes of the metal sheets is for example between 0.5 and 1 mm.

Each cooling duct can have at least one series of cooling air ejection orifices, oriented toward the metal sheets.

The air from the duct cools the metal sheets by impact, so that the temperatures of the metal sheets are homogeneous. In particular, the cooling duct allows the metal sheets to be cooled at the circumferential ends of the channels, i.e. in the regions where the metal sheets are hottest. In this way, the temperature of the cooling air circulating within the connection region and then the channels remains relatively uniform throughout its travel. Better cooling of the metal sheets also facilitates thermal radiation from the case to be cooled toward the cooling channels, which effectively evacuates calories and contributes to uniform and efficient cooling of the case. Such uniform cooling of the case reduces the effects of differential expansions and thus the thermal and mechanical stresses generated in the case, thus increasing the service life thereof.

The connection region corresponds to an air distributor or collector, supplying the various channels.

The duct extends axially and crosses the cooling channels. It should be noted that the term "axial" also covers the case where the duct extends obliquely with respect to the axis of the turbomachine, provided that there is an axial component allowing said duct to cross the cooling channels.

For example, the orifices are designed to achieve a high air ejection speed. The diameter of the duct orifices is for example between 0.5 and 1 mm.

Each duct can have several series of cooling air ejection orifices, each series extending along a line, the lines of the different series being, at least partially parallel to each other.

This improves the distribution of cooling air over the metal sheets that have to be cooled.

Each cooling duct can be in contact with at least one of the metal sheets, in order to exchange heat, in particular by conduction between the duct and the metal sheet. In this case, the cooling duct is preferably made of a material that is a good heat conductor.

Such embodiment makes it possible to reduce the radial overall dimensions of the cooling device.

Of course, it is possible to combine heat exchanges by contact between the duct and the metal sheets, and heat exchanges by impact of an air flow from duct ejection orifices on the metal sheets.

Each duct can be inserted between the two metal sheets joined to one another.

In this case, the ducts are embedded between the metal sheets.

The device may comprise at least one radially inner metal sheet and at least one radially outer metal sheet, joined to one another to form a shroud intended to surround a region that is to be cooled.

The shroud thus extends over 360°. It can be sectorized.

The two metal sheets may have at least one region where the metal sheets are spaced apart to delimit a channel, and regions where the metal sheets are sealingly joined to one another.

In this case, the metal sheets may have air ejection orifices through the two metal sheets, located in the regions where the metal sheets are joined to one another. The orifices allow hot air radially inside the metal sheets to be discharged to a region radially outside the metal sheets.

The metal sheets can define at least one connection region for receiving cooling air, from which at least two cooling air circulation channels extend.

The cross-section of each cooling duct is between 70 mm$^2$ and 500 mm$^2$, the cross-section of each cooling air circulation channel is between 70 mm$^2$ and 500 mm$^2$.

Such a section allows efficient cooling while limiting the mass of the device.

Each cooling duct can be radially spaced from the radially outer metal sheet by 3 to 6 mm.

The invention also relates to an assembly for a turbomachine turbine, comprising at least two devices of the aforementioned type, evenly distributed around the axis of the turbomachine, preferably between two and five devices.

In this case, the metal sheets can be angular sectors. The different sectors can be connected or attached to each other, for example by welding. The different angular sectors can form an annular assembly the metal sheets from the different sectors of which can be formed in one piece. The assembly can then include an inner annular metal sheet in one piece and an outer annular metal sheet in one piece, the plates delimiting several connection zones distributed over the circumference, and channels extending circumferentially from each connection region.

Such a structure makes it possible to limit the cooling air flow which circulates through each connection region and each cooling channel, with the cooling air flow being distributed over the different connection regions or channels. This reduces pressure drops and therefore improves the case cooling efficiency.

The invention also relates to a turbofan engine, comprising a fan downstream of which the following elements extend:
 a primary section in which a primary flow circulates, said primary section passing through, in particular, in the direction of circulation of the primary flow, a compressor, a combustion chamber and a turbine comprising a turbine case,
 a secondary section in which a secondary flow, distinct from the primary flow, circulates
 characterized in that the turbine comprises a cooling device of the aforementioned type, located radially outside the case, air sampling and supply means being able to take air from the secondary section and to direct it into each cooling air circulation channel and into the cooling duct of the device.

The secondary air flow does not pass through the compressor and the combustion chamber, so it is at a relatively low temperature. This air can therefore be extracted and used to effectively cool the desired region of the turbine.

BRIEF DESCRIPTION OF THE DRAWINGS

The invention will be better understood and other details, characteristics and advantages of the invention will become readily apparent upon reading the following description, given by way of a non-limiting example with reference to the appended drawings, wherein.

DETAILED DESCRIPTION

Figure 1:
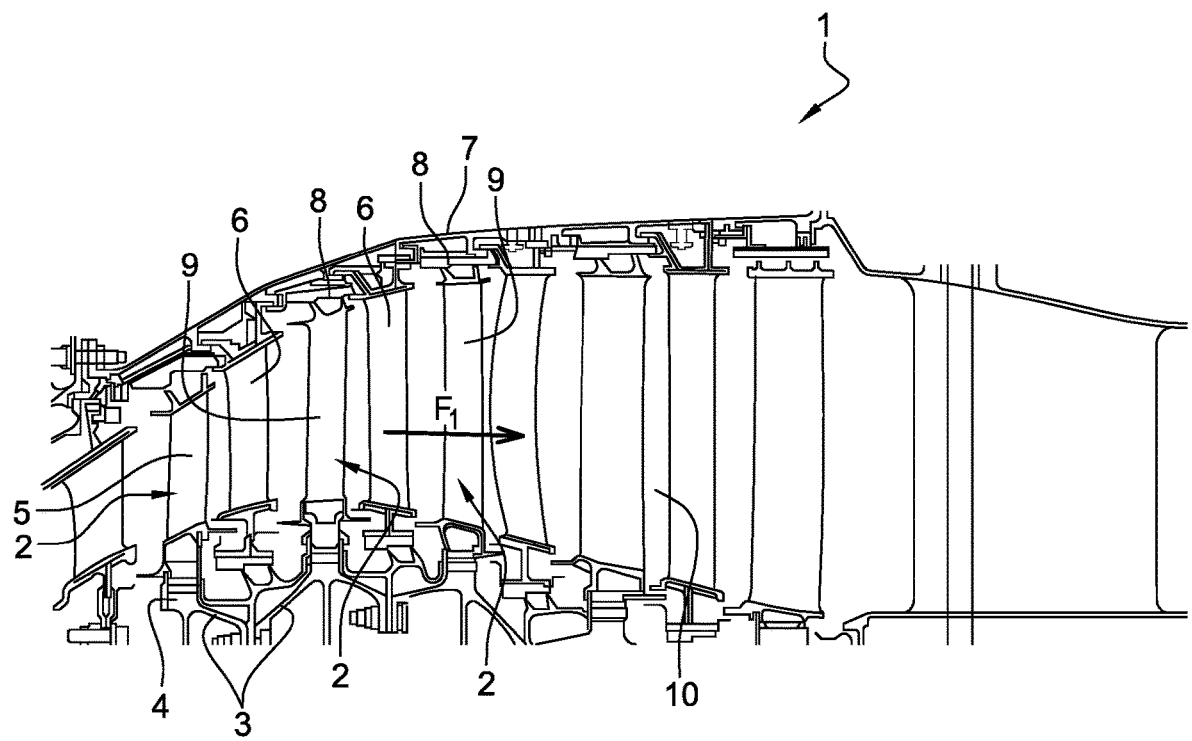
FIG. 1 is an axial sectional view of a portion of a turbofan according to one embodiment of the invention.
Figure 2:
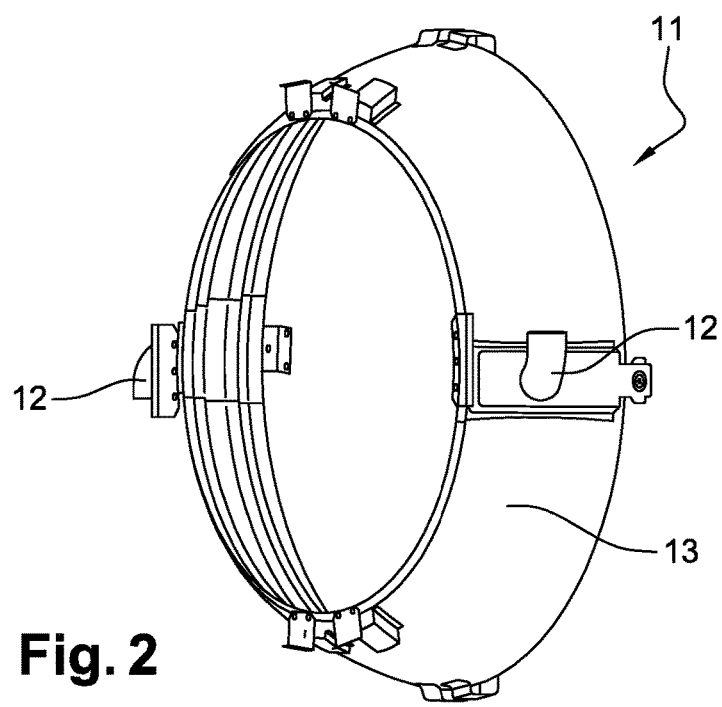
FIG. 2 is a perspective view of a cooling device.
Figure 3:
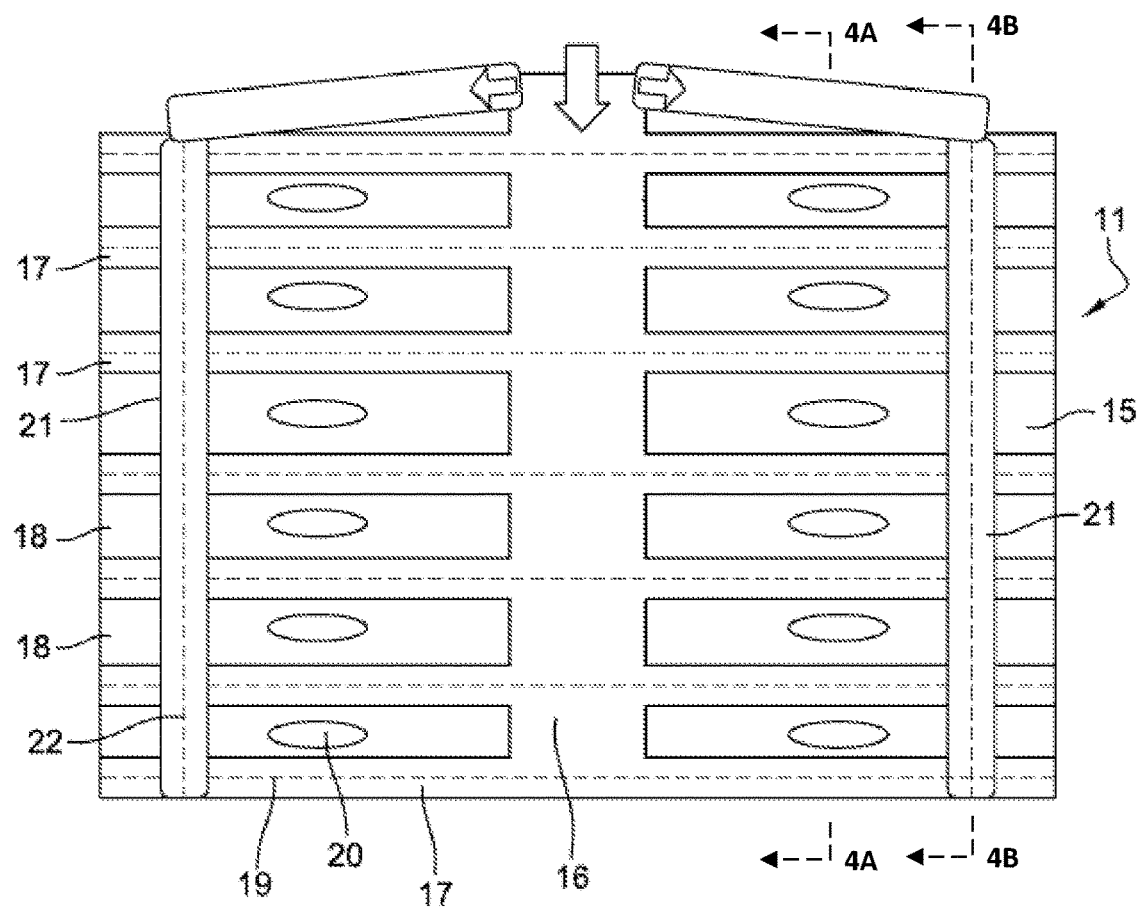
FIG. 3 is a schematic view of a part of the device according to one embodiment of the invention.

FIG. 1 illustrates a part of a turbofan engine according to the invention, in particular the low-pressure turbine 1. Low-pressure turbine includes a rotor with wheels 2 axially connected to each other by annular flanges 3 and each comprising a disc 4 bearing blades 5.

Annular rows of stationary vanes 6 are mounted by suitable means at their radially outer ends on a case 7 of the low-pressure turbine 1 between the mobile wheels 2.

A ring 8 bearing an abradable material surrounds the outer periphery of the blades 9 of each impeller 2.

As previously mentioned, the primary air flow F1 from the combustion chamber circulating in the primary section 10 significantly heats the case 7 and the rings 8.

In order to ensure the cooling of the case 7, the turbofan comprises a cooling device 11 not shown in FIG. 1 but visible in FIGS. 2, 3, 4A and 4B.

This includes air sampling and supply means including a scoop provided with an orifice opening, for example, in the secondary section of the turbojet engine to extract cold air, and connection or distribution members specifically comprising curved regions 12. The air sampling and supply means also include a control valve that can be controlled according to the engine speed and/or flight conditions, for example, in order to adjust the sample flow rate.

The device 11 comprises a shroud 13 formed by the assembly of at least two metal sheets 14, 15, respectively a radially inner metal sheet 14 and a radially outer metal sheet 15. The metal sheets 14, 15 are ring-shaped.

Figure 4A:
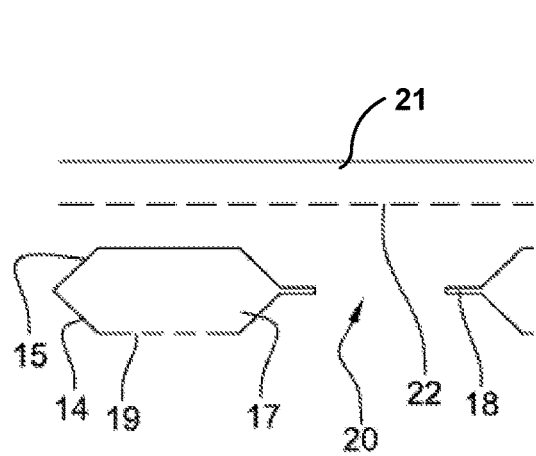
FIGS. 4A and 4B are sectional views of a part of the device of FIG. 3.
Figure 4B:
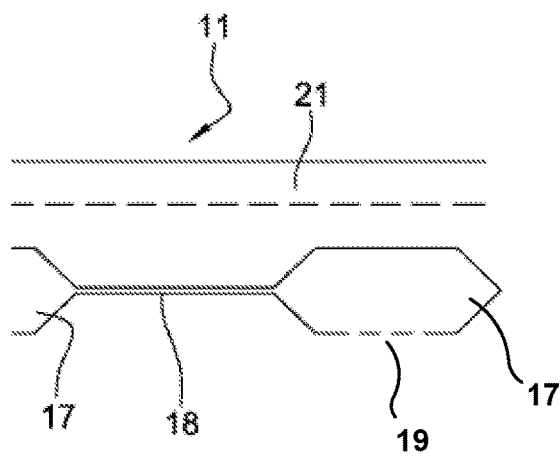

As best shown in FIGS. 4A and 4B, the metal sheets 14, 15 comprise regions where the metal sheets 14, 15 are spaced apart to delimit connection regions 16 and cooling air circulation channels 17, and regions 18 where the metal sheets 14, 15 are sealingly joined to one another.

Each connection region 16 is intended to receive cooling air from the air sampling and supply means, several cooling air circulation channels 17 extend circumferentially from each connection region 16, for example circumferentially on either side of each connection region 16. The shape, distribution and dimensions of the connection regions 16 and channels 17 may vary according to the applications.

Each channel 17 comprises air ejection orifices 19 oriented toward the regions that are to be cooled, such as the turbine case 7, so that the cooling air flowing through the channels 17 is ejected through the orifices 19 and impacts the region to be cooled.

As shown in FIG. 4A, the metal sheets 14, 15 comprise air ejection orifices 20 passing through the two metal sheets 14, 15, located in the regions 18 where the metal sheets 14, 15 are joined to one another as shown in FIG. 4B. The orifices 20 make it possible for hot air radially inside the metal sheets 14, 15 to be discharged to a region located radially outside the metal sheets 14, 15.

The cooling device further comprises ducts 21 through which cooling air from the air sampling and supply means passes, said ducts 21 comprising ejection orifices 22 oriented toward the metal sheets 14, 15. The cooling air passing through the ducts 21 and ejected through said orifices 22 impacts the radially outer metal sheet 15, so as to effectively cool the metal sheets 14, 15.

The shape, dimensions and distribution of the ducts 21 may vary depending on the application. In the embodiment shown in FIGS. 3 and 4, each connection region 16 extends along an axis, i.e. the axis of the turbomachine, each duct 21 extending along an axis parallel to the connection region 16. The channels 17 extend, at least in part, perpendicular to the axis of the connection region 16.

Each cooling duct can be radially spaced from the radially outer metal sheet 15 by a distance between 3 and 6 mm.

The ejection orifices 19 of each channel 17 can be distributed along a line corresponding to the axis of said channel 17. In addition, the ejection orifices 22 of each duct 21 can be distributed along an axis corresponding to the axis of the duct 21.

The diameter of the air ejection orifices 19 of the metal sheets 14, 15 is for example between 0.5 and 1 mm.

The diameter of the air ejection orifices 22 in the ducts 21 is for example between 0.5 and 1 mm.

The ducts 21, for example, have a circular cross-section, with a diameter between 0.5 and 1 mm.

Figure 5:
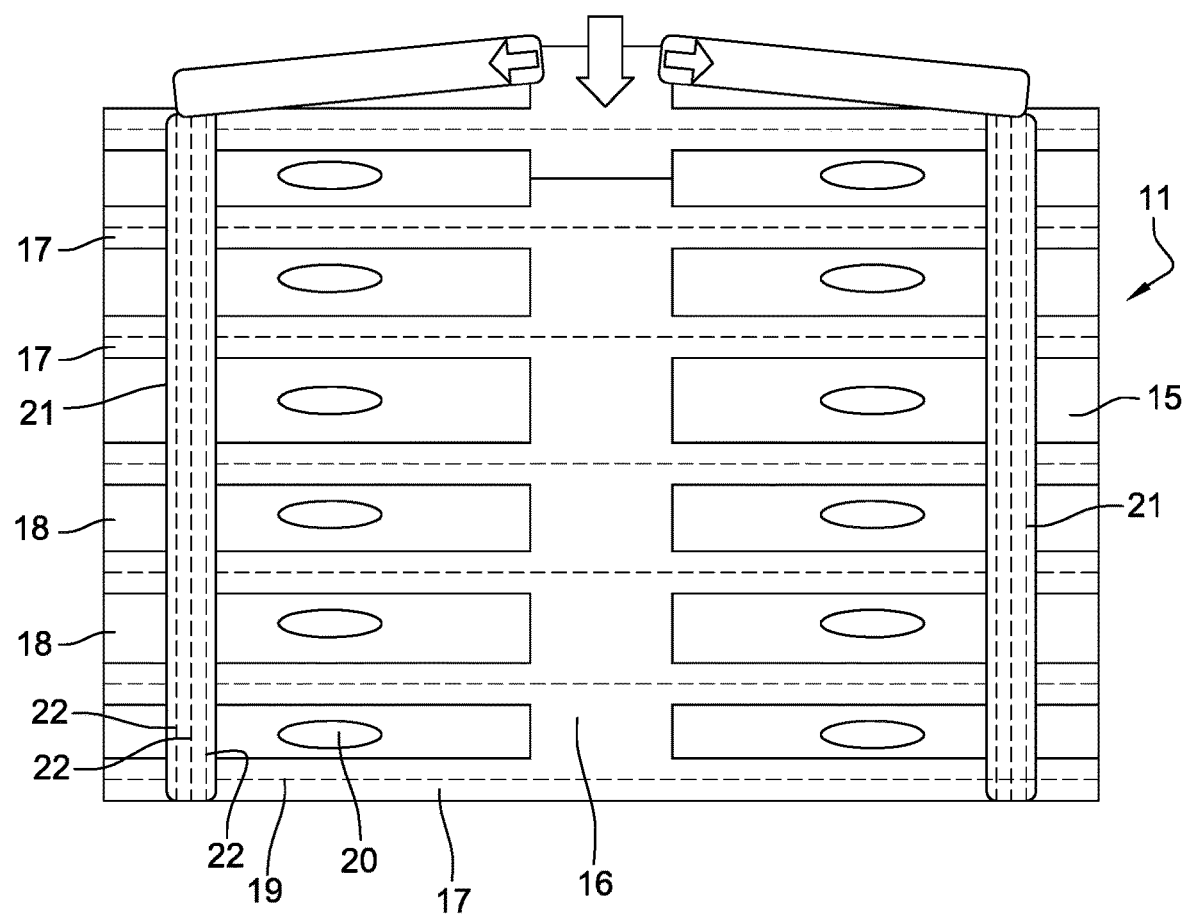
FIG. 5 is a view corresponding to FIG. 3, illustrating another embodiment of the invention.

According to one embodiment shown in FIG. 5, each duct 21 can have several series of cooling air ejection orifices, for example three series, each series extending along a line, the lines of the different series being, at least partially, parallel to each other. In addition, the orifices of each series can also be distributed in a staggered manner.

This improves the distribution of cooling air on the metal sheets 14, 15 and increases the flow of air impacting the metal sheets 14, 15.

In these embodiments, the ducts 21 can be formed by pipes or ducts that can be attached to the metal sheets 14, 15, for example by means of brackets or spacers.

Figure 6:
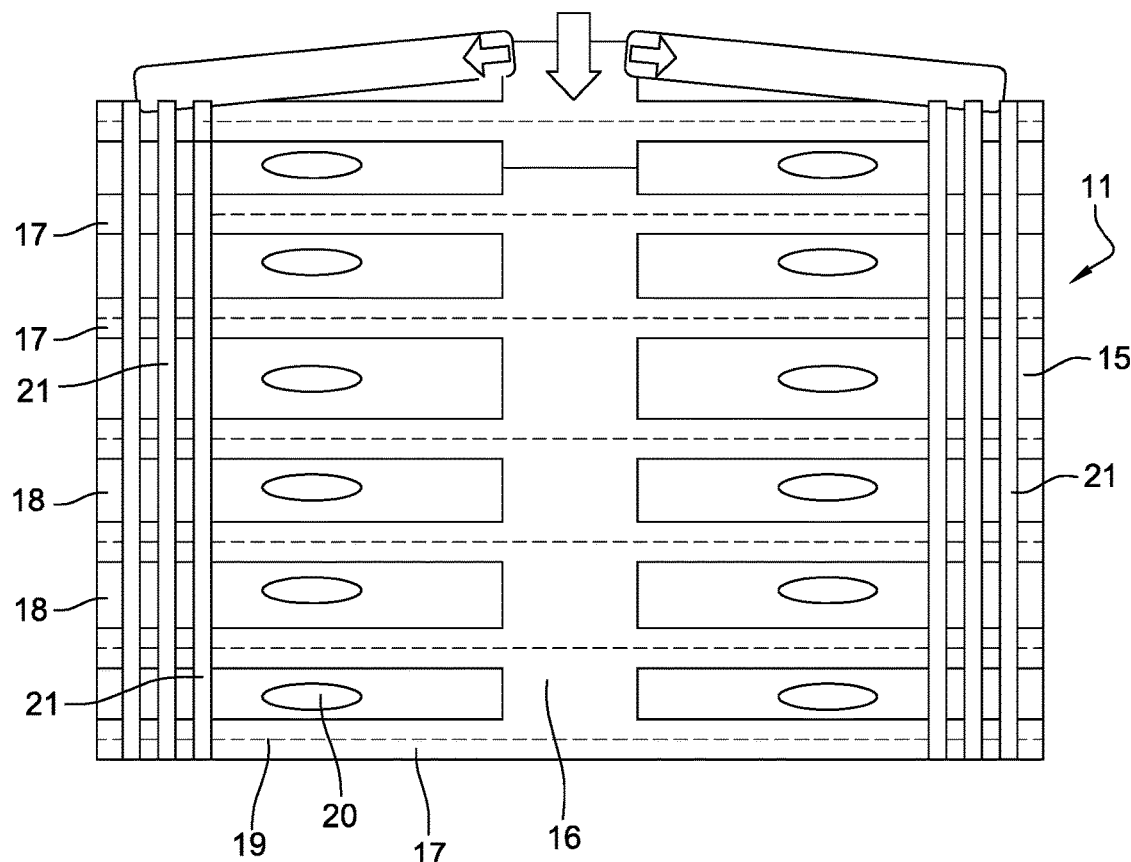
FIG. 6 is a view corresponding to FIG. 3, illustrating still another embodiment of the invention.
Figure 7:
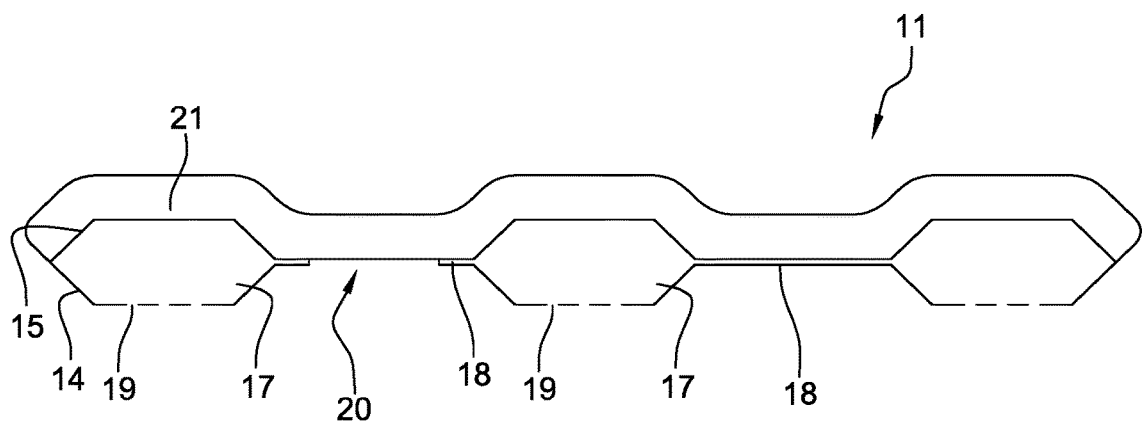
FIG. 7 is a sectional view of a part of the device of FIG. 6.

FIGS. 6 and 7 show one embodiment, wherein the ducts 21 come into contact with at least one of the metal sheets 14, 15, for example into contact with the radially outer metal sheet 15. For example, each duct 21 is welded to the corresponding metal sheet 15. The duct 21 may then have no ejection orifice, the heat exchange being carried out by thermal conduction.

The diameter of each duct 21 is preferably relatively small, for example between 5 and 15 mm, in order to maximize conduction heat exchanges. The cross-section of each duct 21 can also be adapted to the relevant metal sheet 15 in order to maximize the contact cross-section.

According to an alternative embodiment, not shown, each duct 21 comes into contact with the inner metal sheet 14 or is inserted between the two metal sheets 14, 15.

The invention claimed is:

1. A cooling device (11) for a turbine of a turbomachine extending along an axis, comprising at least one radially inner metal sheet (14) and one radially outer metal sheet (15) that are joined to one another and delimit, between them, cooling air circulation channels (17) extending circumferentially from a connection region (16), each channel of the cooling air circulation channels (17) comprising at least one air inlet and air ejection orifices (19), that are designed to be oriented toward a region to be cooled, characterized in that
the cooling device comprises means for cooling the at least one radially inner metal sheet and the at least one radially outer metal sheet comprising at least one cooling duct (21) intended for the circulation of cooling air,
the at least one cooling duct (21) being located radially outside the at least one radially inner metal sheet and the at least one radially outer metal sheet and adjacent to or in contact with the at least one radially inner metal sheet and the at least one radially outer metal sheet so as to cool the at least one radially inner metal sheet and the at least one radially outer metal sheet,
the at least one cooling duct (21) extending axially and arranged at a distance away from the at least one air inlet and towards circumferential end regions of the cooling air circulation channels (17),
characterized in that each cooling duct (21) of the at least one cooling duct comprises at least one series of cooling air ejection orifices (22) oriented toward the at least one radially inner metal sheet and the at least one radially outer metal sheet.

2. The cooling device according to claim 1, characterized in that each cooling duct (21) of the at least one cooling duct comprises more than one series of the at least one series of cooling air ejection orifices (22), each series of the more than one series of the at least one cooling air ejection orifices (22) extending along a line, the lines of each more than one series being, at least partially, parallel to each other.

3. The cooling device according claim 1, characterized in that each cooling duct (21) of the at least one cooling duct is in contact with at least one of the metal sheets (14, 15), so as to exchange heat, in particular by conduction between the cooling duct and the metal sheet (15).

4. The cooling device according to claim 3, characterized in that each cooling duct (21) of the at least one cooling duct is inserted between the two metal sheets (14, 15) that are joined to one another.

5. The cooling device according to claim 3, characterized in that the cooling device comprises the at least one radially inner metal sheet (14) and the at least one radially outer metal sheet (15), that are joined to one another so as to form a shroud intended to surround a region that is to be cooled.

6. The cooling device according to claim 3, characterized in that the at least one radially inner metal sheet and the at least one radially outer metal sheet comprise at least one region (16, 17) where the metal sheets (14, 15) are spaced apart from each other in order to delimit a channel of cooling air circulation channels, and other regions (18) where the at least one radially inner metal sheet and the at least one radially outer metal sheet are sealingly joined to one another.

7. The cooling device according to claim 3, characterized in that the at least one radially inner metal sheet and the at least one radially outer metal sheet define at least one connection region (16) for receiving cooling air, from which at least two cooling air circulation channels (17) of the cooling air circulation channels extend.

8. The cooling device according to claim 1, characterized in that the cooling device comprises the at least one radially inner metal sheet (14) and the at least one radially outer metal sheet (15), that are joined to one another so as to form a shroud surrounding a region that is to be cooled.

9. The cooling device according to claim 1, characterized in that the metal sheets (14, 15) comprise at least one region (16, 17) where the at least one radially inner metal sheet and the at least one radially outer metal sheet are spaced apart from each other in order to delimit a channel of the cooling air circulation channels, and other regions (18) where the at least one radially inner metal sheet and the at least one radially outer metal sheet are sealingly joined to one another.

10. The cooling device according to claim 9, characterized in that the at least one radially inner metal sheet and the at least one radially outer metal sheet comprise additional air ejection orifices (20) passing through the at least one radially inner metal sheet and the at least one radially outer metal sheet, located in the regions (18) where the metal sheets (14, 15) are joined to one another.

11. The cooling device according to claim 1, characterized in that the at least one radially inner metal sheet and the at least one radially outer metal sheet define the at least one connection region (16) for receiving cooling air, from which at least two cooling air circulation channels (17) of the cooling air circulation channels extend.

12. The cooling device according to claim 1, characterized in that the cross-section of each cooling duct (21) of the at least one cooling duct is between 70 mm$^2$ and 500 mm$^2$, the cross-section of each cooling air circulation channel (17) of the cooling air circulation channels being between 70 mm$^2$ and 500 mm$^2$.

13. An assembly for a turbomachine turbine, comprising at least two devices according to claim 1, evenly distributed around an axis of the turbomachine.

* * * * *